(12) United States Patent
Sato et al.

(10) Patent No.: US 8,797,613 B2
(45) Date of Patent: Aug. 5, 2014

(54) IMAGE READER

(71) Applicants: Shougo Sato, Seto (JP); Yukihiko Sato, Nagoya (JP); Ryoichi Nakagawa, Nagoya (JP); Tomoyuki Nanno, Nagoya (JP)

(72) Inventors: Shougo Sato, Seto (JP); Yukihiko Sato, Nagoya (JP); Ryoichi Nakagawa, Nagoya (JP); Tomoyuki Nanno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/845,340

(22) Filed: Mar. 18, 2013

(65) Prior Publication Data

US 2014/0092450 A1 Apr. 3, 2014

(30) Foreign Application Priority Data

Sep. 28, 2012 (JP) ................................. 2012-217458

(51) Int. Cl.
*H04N 1/04* (2006.01)

(52) U.S. Cl.
USPC ........... 358/498; 358/474; 358/501; 399/124; 399/110

(58) Field of Classification Search
CPC ........... H04N 1/00591; H04N 1/00278; B65H 3/0615; B65H 5/26; B65H 39/10; B65H 7/20; B65H 5/02; B65H 5/06; B65H 7/02; G06F 1/32

USPC .................. 358/498, 474, 501, 496; 399/124, 399/111.11, 107, 114, 119

See application file for complete search history.

(56) References Cited

U.S. PATENT DOCUMENTS

| 4,610,446 | A | * | 9/1986 | Ide ................................. 271/291 |
| 5,587,782 | A | * | 12/1996 | Johdai et al. ................... 399/394 |
| 5,734,758 | A | * | 3/1998 | Yamamoto et al. ............ 382/274 |
| 5,992,841 | A | * | 11/1999 | Fujii et al. ..................... 271/3.02 |
| 6,750,989 | B1 | * | 6/2004 | Kamada et al. ................ 358/488 |
| 6,755,733 | B2 | * | 6/2004 | Horiguchi et al. ............ 454/184 |
| 7,341,387 | B2 | * | 3/2008 | Nishimura et al. ............ 400/693 |
| 7,651,092 | B2 | * | 1/2010 | Hirao et al. .................... 271/298 |

FOREIGN PATENT DOCUMENTS

| JP | 5207242 | 8/1993 |
| JP | 2006111413 | 4/2006 |
| JP | 2008053819 | 3/2008 |

* cited by examiner

*Primary Examiner* — Negussie Worku
(74) *Attorney, Agent, or Firm* — Banner & Witcoff, Ltd.

(57) ABSTRACT

The disclosure generally relates to a cover portion of an image reader or other multifunctional peripheral. The cover portion may move between an uncovering position and a covering position by pivoting about a first axis. The cover portion may include a movable member that moves between an open position where the movable member functions as a document tray and a closed position where the movable member constitutes a part of an upper surface of the cover portion. The cover portion may also include a conveyor configured to convey one or more documents placed on the movable member when it is in the open position. Further, the cover portion may include an operation portion configured to receive user inputs. Moreover, the operation portion may be positioned near a center of the cover portion.

20 Claims, 8 Drawing Sheets

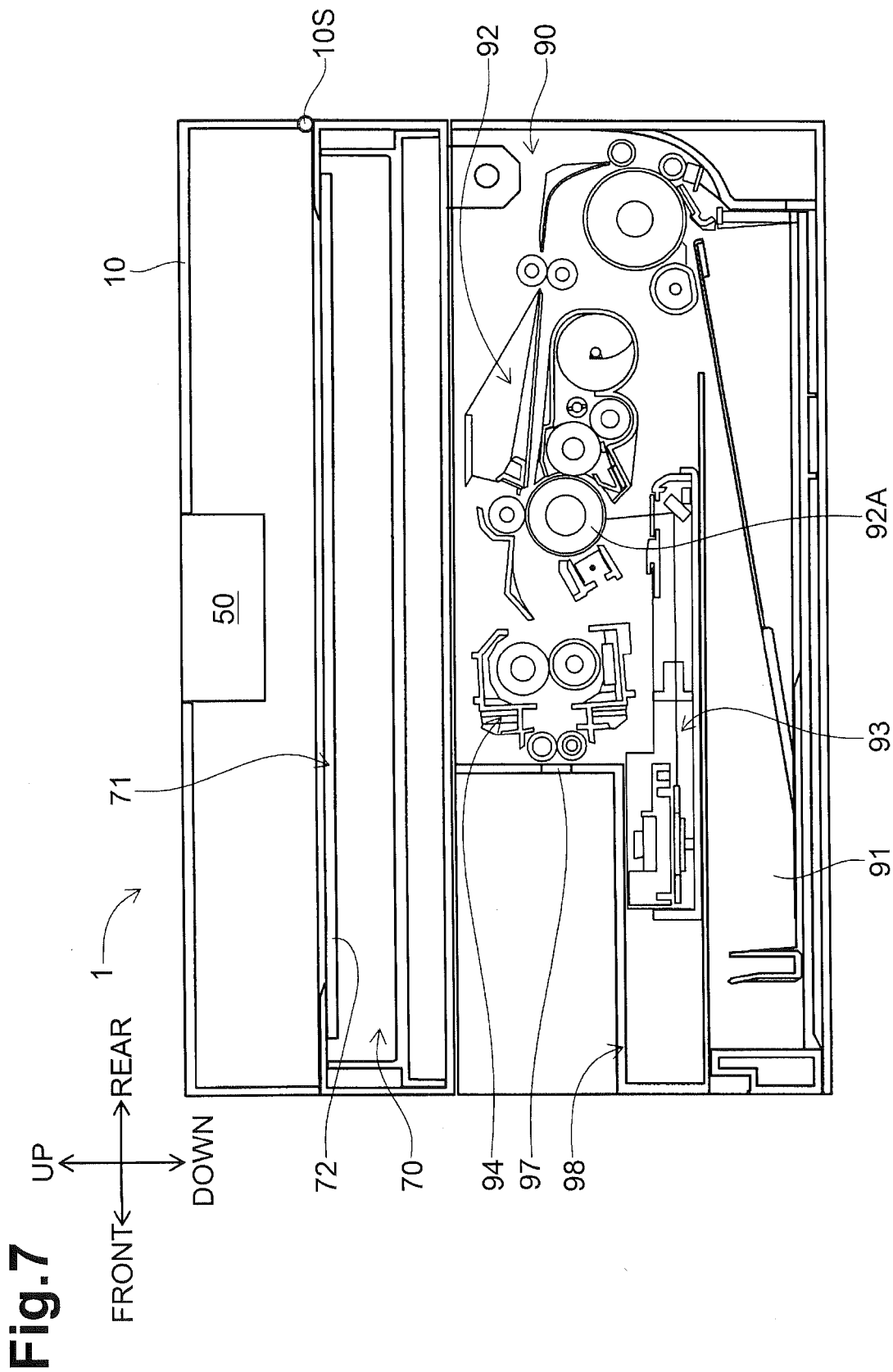

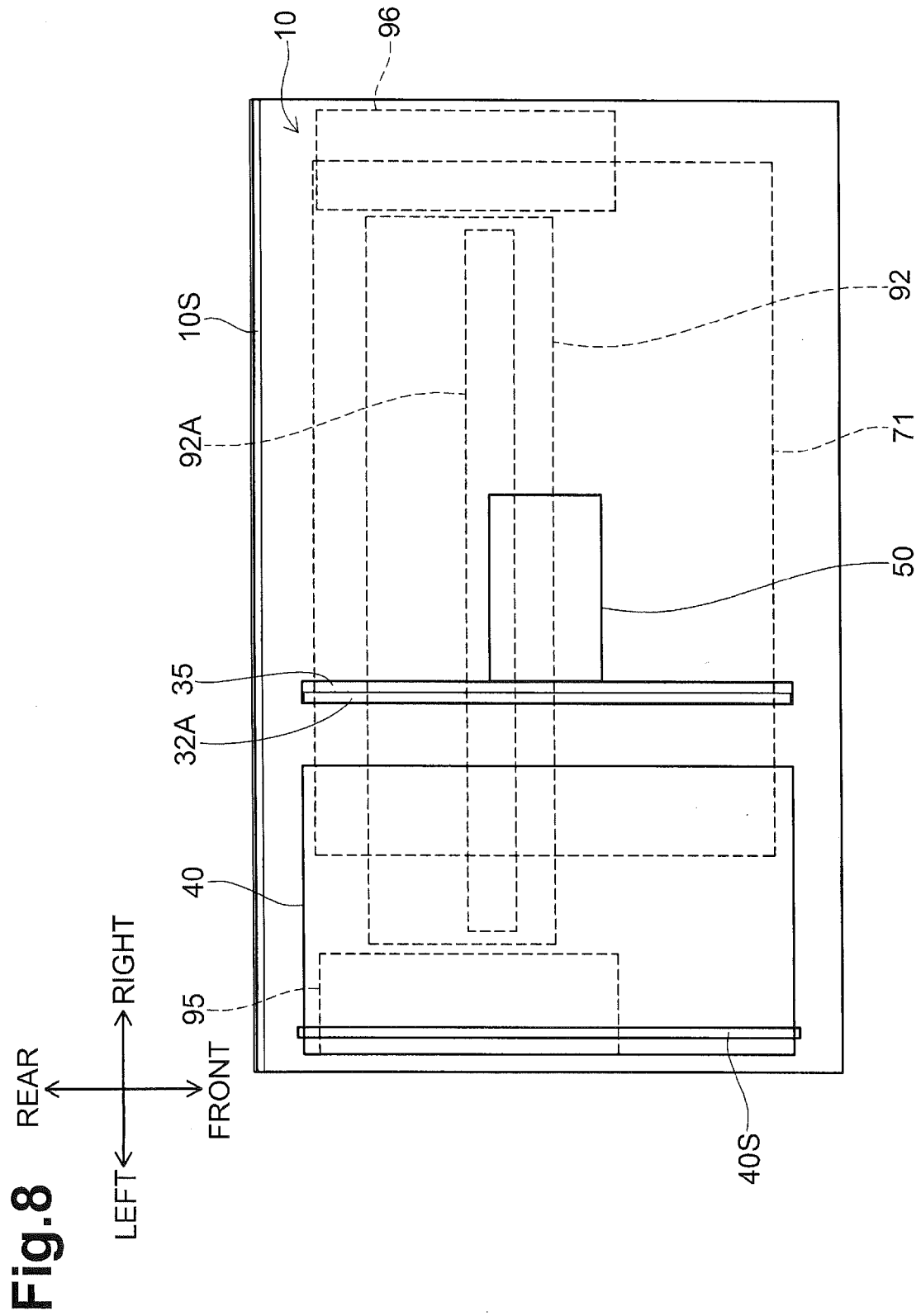

IMAGE READER

CROSS-REFERENCE TO RELATED APPLICATION

This application claims priority from Japanese Patent Application No. 2012-217458, filed on Sep. 28, 2012, which is incorporated herein by reference in its entirety.

FIELD OF DISCLOSURE

The disclosure relates to an image reader including a cover portion configured to be movable between an uncovering position where the cover portion exposes a document mount surface on which a document is to be placed and a covering position where the cover portion covers the document mount surface by pivoting about a predetermined shaft, wherein the cover portion may hold a document placed on the document mount surface when in the covering position and the image reader may read an image from the document using a reader portion.

BACKGROUND

A known image reader includes a document mount surface, a cover portion, and a reader portion. The document mount surface is configured such that a document is to be placed thereon. The cover portion is disposed movably between a covering position and an uncovering position by pivoting about a predetermined shaft. When the cover portion is located in the covering position, the cover portion covers the document mount surface. When the cover portion is located in the uncovering position, the cover portion uncovers the document mount surface. The known image reader reads an image from a document placed on the document mount surface while the cover portion is located in the covering position.

As an example of the known image reader, there has been known an image reader that includes a document cover, a document glass, and a document reader portion. The image reader is configured to read an image from a document placed on the document glass by the document reader portion in accordance with a start instruction inputted via an operation panel thereof.

SUMMARY

Recently, there has been a need for image readers to be reduced in size and/or to offer space savings when the image readers are installed. In the known image reader, however, the operation panel is disposed on a protruding portion that may protrude frontward from an upper front of the image reader. In such an image reader, the operation panel may protrude forward. Therefore, an area of an upper surface of the image reader may become larger. Thus, the known image reader as a whole may require a larger space.

Embodiments of the disclosure provide for an image reader that uses space in a desirable manner although it includes a cover portion disposed pivotably about a predetermined shaft and a reader portion that reads an image from the document.

One or more aspects of the disclosure relate to an image reader which may include a reading unit, a document mount surface, and a cover portion and may be configured to read, using the reading unit, an image from a document placed on the document mount surface. The cover portion may be configured to move between an uncovering position where the cover portion may expose (e.g., uncover) an upper side of the document mount surface and a covering position where the cover portion may cover the upper side of the document mount surface by pivoting about a first pivot shaft. When the cover portion covers the upper side of the document mount surface, the cover portion may perform a function of holding the document placed on the document mount surface. Further, the cover portion may include a conveyor, an operation portion, and a movable member. The movable member may be configured to move by pivoting about a second pivot shaft. When the movable member is opened, the movable member may function as a document tray. The image reader may be configured to read an image from the document being conveyed by the conveyor from the movable member functioning as the document tray. According to the image reader, the operation portion may be disposed on an upper surface of the cover portion and above the document mount surface. Therefore, an area of an upper surface of the image reader may be reduced as compared with a case where the operation portion is disposed outward from the document mount surface in the above-mentioned known image reader. As a result of this, the image reader may offer space savings. When the movable member is opened for use as the document tray, an end, opposite to an end at which the second pivot shaft may be disposed, may be located in a position farther from the operation portion than when the movable member is closed. Therefore, in the image reader, when one or more documents are placed on the movable member functioning as the document tray, the operation portion may be accessible. In the image reader, the second pivot shaft of the movable member may be disposed at the other end of the cover portion. When the movable member is closed, the other end at which the second pivot shaft may be disposed may be located at a position relatively close to the operation portion and constitute a part of the upper surface of the cover portion. That is, when the movable member is closed while not being used as the document tray, the movable member may constitute the part of the upper surface of the cover portion. Therefore, the image reader may offer space savings.

This summary is not intended to identify critical or essential features of the inventions claimed herein, but instead merely summarizes certain features and variations thereof. Other objects, features, and advantages will be apparent to persons of ordinary skill in the art from the following detailed description of the disclosure and the accompanying drawings.

DESCRIPTION OF THE DRAWINGS

Some features herein are illustrated by way of example, and not by way of limitation, in the figures of the accompanying drawings in which like reference characters refer to similar elements.

FIG. 7 is a side sectional view depicting the multifunction peripheral in the second illustrative embodiment according to one or more aspects of the disclosure.

FIG. 8 is an explanatory diagram depicting a location of an operation panel in the multifunction peripheral in the second illustrative embodiment according to one or more aspects of the disclosure.

DETAILED DESCRIPTION OF EXAMPLE EMBODIMENTS

For a more complete understanding of the present disclosure, needs satisfied thereby, and the objects, features, and advantages thereof, reference now is made to the following descriptions taken in connection with the accompanying drawings.

Hereinafter, illustrative embodiments in which a multifunction peripheral 1 embodies an image reader according to the aspects of the disclosure are described with reference to the accompanying drawings.

First, a schematic configuration of the multifunction peripheral 1 according to a first illustrative embodiment is described with reference to FIGS. 1 and 2. An up-down direction may be defined with reference to an upright orientation in which the multifunction peripheral 1 is used. A side of the multifunction peripheral 1, in which a first pivot shaft 10S of a document cover portion 10 is provided, may be defined as the rear of the multifunction peripheral 1. A front-rear direction may be defined with reference to the rear of the multifunction peripheral 1. A right-left direction may be defined with respect to the multifunction peripheral 1 as viewed from its front.

Figure 1:
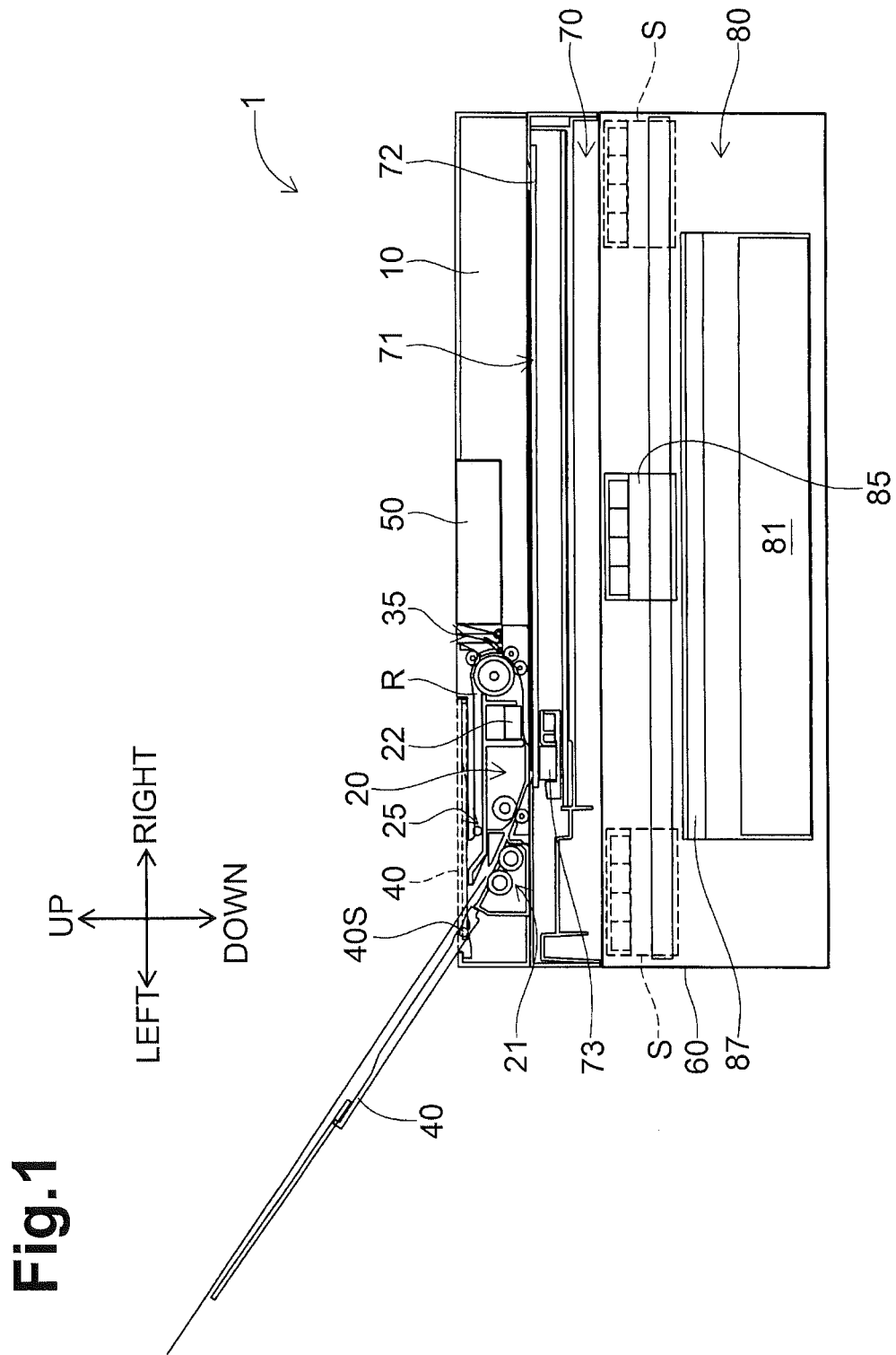
FIG. 1 is a front sectional view depicting a multifunction peripheral in a first illustrative embodiment according to one or more aspects of the disclosure.
Figure 2:
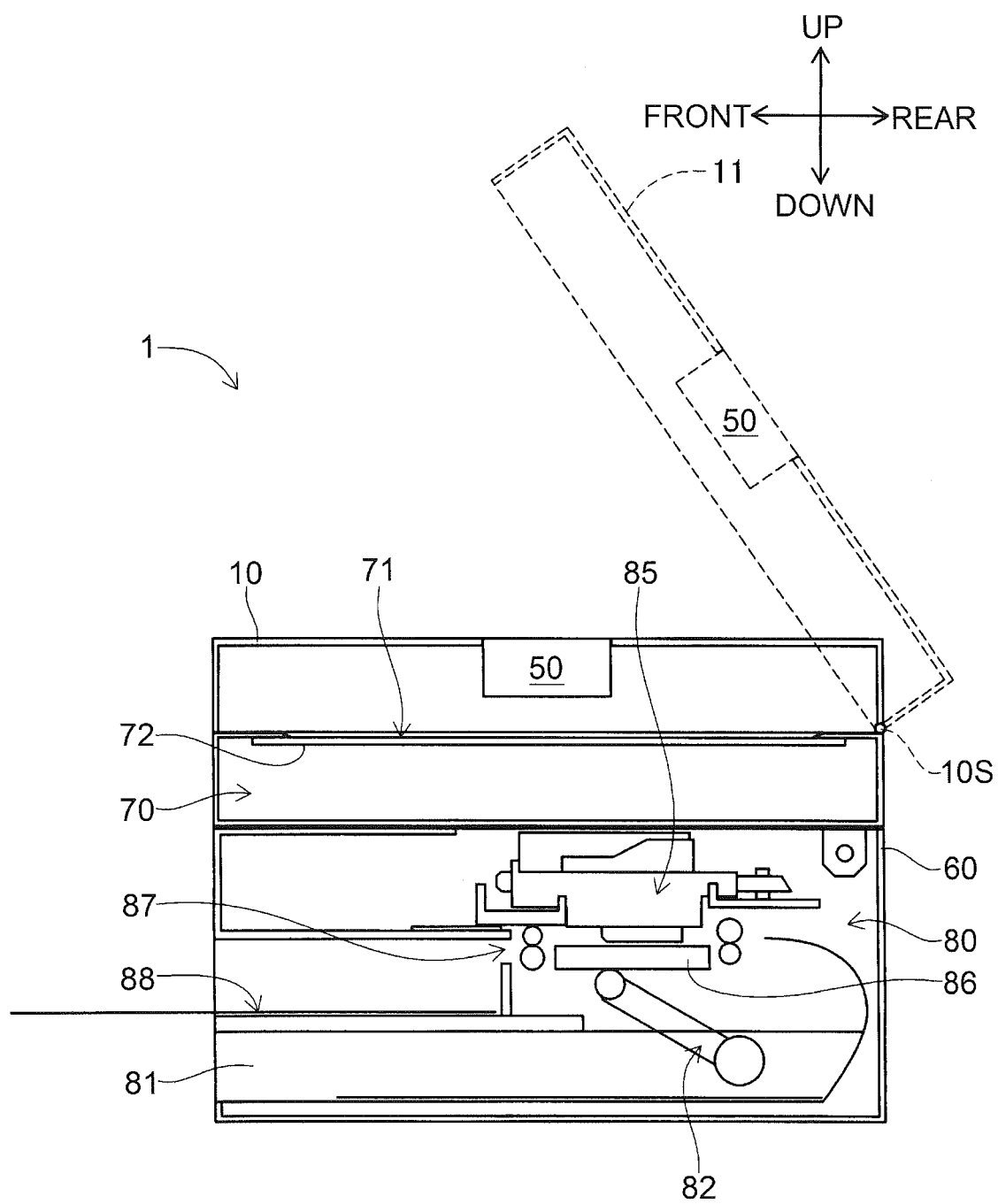
FIG. 2 is a side sectional view depicting the multifunction peripheral in the first illustrative embodiment according to one or more aspects of the disclosure.

As depicted in FIGS. 1 and 2, the multifunction peripheral 1 may comprise a document cover portion 10, a reading unit, and a body housing 60. The reading unit may include one or more image sensors described further below. The document cover portion 10 may be configured to be pivotable about the first pivot shaft 10S that may extend in the right-left direction at a rear edge of an upper surface of the body housing 60 such that the document cover portion 10 may be opened and closed. When the document cover portion 10 is closed, the document cover portion 10 may cover the upper surface of the body housing 60 (i.e., a document mount surface 71). The document cover portion 10 may be configured to perform a function of holding a document placed on the document mount surface 71 when the document cover portion 10 is closed. Herein, holding a document may include applying a force to the document to keep it in place or blocking other forces from moving the document. The first pivot shaft 10S may protrude from one of the document cover portion 10 and the body housing 60 to which the document cover portion 10 may be attached. The first pivot shaft 10S may have another configuration as long as the document cover portion 10 is capable of pivoting about the first pivot shaft 10S.

The document cover portion 10 may further comprise an automatic document conveyor 20 (e.g., an automatic document feeder ("ADF")), a movable tray 40, and an operation panel 50. The automatic document conveyor 20 may be disposed at a leftward part of the document cover portion 10 with respect to a middle part of the document cover portion 10. The automatic document conveyor 20 may be configured to feed documents, one by one, successively, from a stack of documents placed on the movable tray 40, convey the document along a predetermined conveyance path R, and discharge the document onto the movable tray 40. The multifunction peripheral 1 may be configured to read an image from the document by a scanner unit 70 while the automatic document conveyor 20 conveys the document. The scanner unit 70 may be disposed above the body housing 60. A configuration of the automatic document conveyor 20 is further described below with reference to the appropriate drawings.

Figure 3:
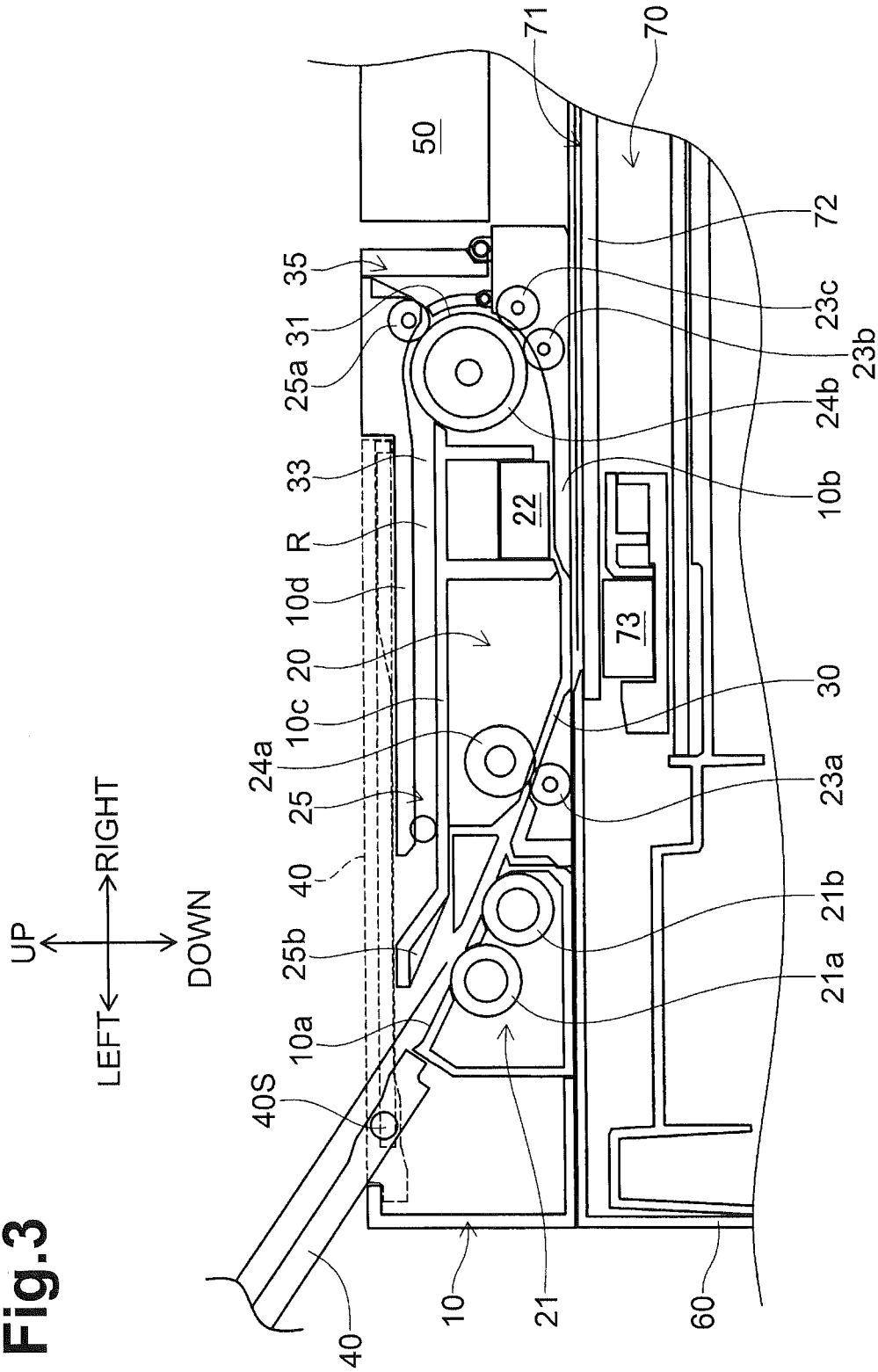
FIG. 3 is a cross-sectional view depicting an automatic document feeder of the multifunction peripheral in the first illustrative embodiment according to one or more aspects of the disclosure.

As depicted in FIGS. 1 and 3, the movable tray 40 may be disposed at an upper left end portion of the document cover portion 10 and configured to be pivotable about a second pivot shaft 40S disposed at one end of the movable tray 40 such that the movable tray 40 may be opened and closed. As indicated by a dashed line in FIGS. 1 and 3, when the movable tray 40 is closed toward the inside of the multifunction peripheral 1, the movable tray 40 may be opposite to the top of the automatic document conveyor 20 and constitute a part of an upper surface of the document cover portion 10. In this state, the upper surface of the movable tray 40 may be in the same plane as the upper surface of the document cover portion 10 (indicated by the dashed line in FIGS. 1 and 3). The other end (that may be opposite to the one end at which the second pivot shaft 40S may be disposed) of the movable tray 40 may be located near the operation panel 50 disposed on the middle part of the upper surface of the document cover portion 10 when the movable tray 40 is closed. The second pivot shaft 40S may protrude from one of the movable tray 40 and the document cover portion 10 to which the movable tray 40 may be attached. The second pivot shaft 40S may have another configuration as long as the movable tray 40 is capable of pivoting about the second pivot shaft 40S.

When the movable tray 40 is opened toward the outside of the multifunction peripheral 1, as indicated by the solid lines of the movable tray 40 in FIGS. 1 and 3, the movable tray 40 may be maintained in an inclined position at a predetermined angle. That is, the other end, which may be opposite to the end at which the second pivot shaft 40S may be disposed, of the movable tray 40 may be moved away from the operation panel 50 disposed on the middle part of the upper surface of the document cover portion 10 during the opening of the movable tray 40, and finally, be located to the left of a left end of the document cover portion 10. When the movable tray 40 is in the open position as depicted in FIGS. 1 and 3, a document to be conveyed by the automatic document conveyor 20 may be placed on the opened movable tray 40. In some examples, a document may be placed on the movable tray 40 so that longer sides of the document extend along the right-left direction of the multifunction peripheral 1 (i.e., shorter sides of the document extend in the front-rear direction of the multifunction peripheral 1). In light of the above, the movable tray 40 may function as a document feed tray. At the same time, the movable tray 40 may be configured such that one or more documents discharged by the automatic document conveyor 20 may be stacked thereon. Therefore, the movable tray 40 may also serve as a discharge tray.

As depicted in FIGS. 1-5, the operation panel 50 may be disposed on an upper surface of the document cover portion 10 so that it may be accessible to a user. For example, the operation panel 50 may form a part of the upper surface of the cover portion 10. In particular, the operation panel 50 may be disposed at the middle part of the upper surface of the document cover portion 10 (i.e. the middle part with respect to the front-rear direction and the right-left direction). For example, the operation panel 50 may be directly above the document mount surface 71 with a portion of the document cover portion 10 therebetween. In some embodiments, the operation panel 50 may be disposed on an upper surface of the cover portion at a position in which the operation portion does not overlap with the conveyor 20 and movable tray 40 in an up-down direction and is spaced apart from an edge of the cover that is on the opposite side of the operation portion than the conveyor. In other embodiments, the operation panel may be disposed on an upper surface of the cover portion at a position in which the center of the operation portion is closer to the center of the upper surface than to any of the edges of the cover portion. The operation panel 50 may comprise a plurality of input keys and buttons, a touch-sensitive screen, and/or a liquid crystal display. The operation panel 50 may be configured to be operated by a user to input various instructions into the multifunction peripheral 1.

The body housing 60 may accommodate the scanner unit 70, an image formation unit 80, and a controller therein. The scanner unit 70 may be disposed in an upper part of the body housing 60. The scanner unit 70 may comprise a contact glass 72, a first image sensor 73, a slide shaft, a motor for reading and conveyance, and a flat cable (see FIG. 1). The contact glass 72 may constitute at least a part of the document mount surface 71, which may be a part of the upper surface of the body housing 60. The scanner unit 70 may be configured to read an image from a document placed on the document mount surface 71 by the first image sensor 73. A configuration of the scanner unit 70 is further described later with reference to appropriate drawings.

The image formation unit 80 may be disposed below the scanner unit 70. The image formation unit 80 may comprise a sheet cassette 81, a sheet feed portion 82, a recording head 85, a platen 86, a sheet outlet 87, and a sheet output portion 88. The sheet cassette 81 may be disposed such that the sheet cassette 81 may be removably attachable from the front of the body housing 60. The image formation unit 80 may be configured to print (output) inputted image data by an inkjet printing method in accordance with control of the controller by using one or more sheets accommodated in the sheet cassette 81. The multifunction peripheral 1 may implement a copying function by controlling the image formation unit 80 for image data based on the image read by the scanner unit 70 as data to be processed. Further, the multifunction peripheral 1 may implement a printing function by controlling the image formation unit 80 for print data inputted via a network as data to be processed. A configuration of the image formation unit 80 is further described later with reference to appropriate drawings.

The controller may comprise a central processing unit ("CPU"), and memory, including a read-only memory ("ROM"), a random access memory ("RAM"), etc. The controller may serve as a nerve center of control for implementing one or more of a scanning function and the printing function of the multifunction peripheral 1.

Next, the configuration of the automatic document conveyor 20 is now described with reference to FIGS. 1 and 3. The automatic document conveyor 20 may comprise a document separation portion 21 and a document discharge portion 25 that may comprise a conveyor roller 24a, a larger-diameter conveyor roller 24b, pinch rollers 23a-23c, and a discharge roller 25a. A path through which a document separated from the stack by the document separation portion 21 may be conveyed while being guided by the rollers and guide surfaces disposed in the automatic document conveyor 20 may be referred to as a conveyance path R (see FIG. 3). A second image sensor 22 may be disposed between the conveyor roller 24a and the larger-diameter conveyor roller 24b on the conveyance path R. The automatic document conveyor 20 may further comprise a path switching mechanism portion 35.

First, a configuration of the conveyance path R is described. The conveyance path R may be defined in the interior of the automatic document conveyor 20. The conveyance path R may comprise a leading path 30, a first path 31, and a discharge path 33. The leading path 30 may extend along the right-left direction of the multifunction peripheral 1 from the movable tray 40. The first path 31 may be curved and continued from the leading path 30. The first path 31 may be positioned to the left of the operation panel 50. The discharge path 33 may be continued from the first path 31 and extend to the movable tray 40.

The leading path 30 may be defined by an inclined surface 10a that may extend toward the scanner unit 70 from a position near the second pivot shaft 40S of the movable tray 40. The document separation portion 21 may be disposed on the inclined surface 10a. A continuous surface 10b may be continued from the inclined surface 10a and face the document mount surface 71. The continuous surface 10b may have an opening facing an initial position of the first image sensor 73. A part of the conveyance path R may be defined by the inclined surface 10a, the continuous surface 10b, and the rollers, such as the conveyor roller 24a. While a document is conveyed through the conveyance path R, an image of the document may be read by the first image sensor 73 via an opening when the document passes a reading area of the first image sensor 73.

The first path 31 may be continued from the leading path 30 and have a substantially U-shape when viewed in the side sectional view. The first path 31 may be located to the left of the operation panel 50, which may be disposed at the middle part of the automatic document conveyor 20. The first path 31 may be configured to change the conveying direction of a document that may be conveyed along the leading path 30 from the movable tray 40 180 degrees. For example, the first path 31 may change the conveying direction of a document from a rightward direction to a leftward direction (see FIGS. 3 and 4).

Figure 4:
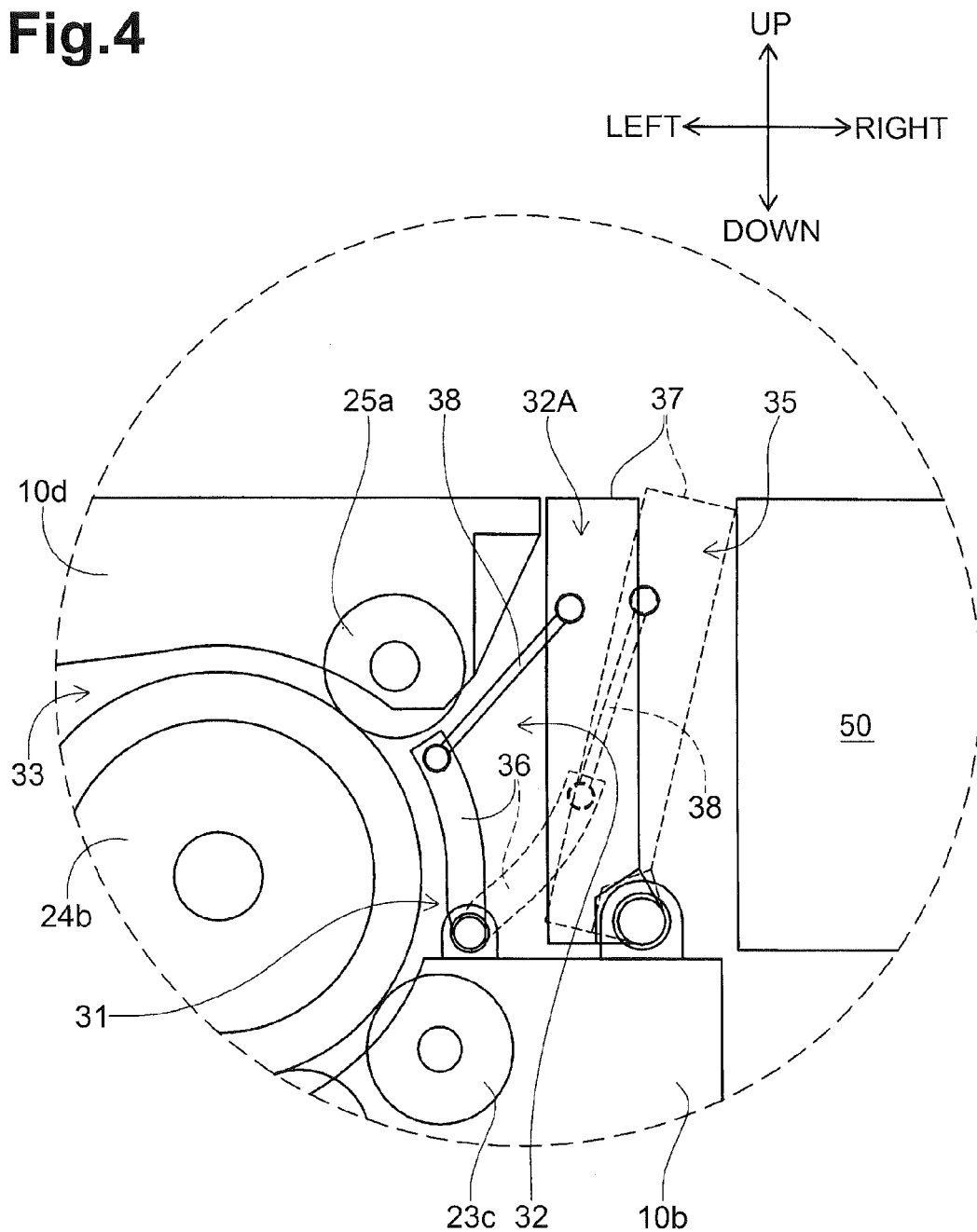
FIG. 4 is a cross-sectional view depicting a path switching mechanism portion of the multifunction peripheral in the first illustrative embodiment according to one or more aspects of the disclosure.

A second path 32 may branch off from the first path 31. As depicted in FIG. 4, the second path 32 may connect a middle part of the first path 31 and the document outlet 32A with each other. The document outlet 32A may be an opening defined in the upper surface of the document cover portion 10 and located to the left of the operation panel 50. As depicted in FIG. 4, a path switching mechanism portion 35 may be disposed at the branch point of the first path 31 and the second path 32. The direction of the document to be conveyed along the leading path 30 may be changed between the first path 31 and the second path 32 by moving the path switching mechanism portion 35.

In the first illustrative embodiment, a direction that a document separated from the stack of documents placed on the movable tray 40 is conveyed through one of the first path 31 and the second path 32 via the leading path 30 may be referred to as a document conveyance direction. The conveyance path R may have a width that may correspond to a shorter side of a document, that is, the width of the conveyance path R may have a size that may be the same as the size of the shorter side of the document or a size that may have a predetermined margin for the shorter side of the document such that the conveyance path R may allow the document to pass therethrough smoothly.

Next, the portions consisting of the automatic document conveyor 20 are described. The document separation portion 21 may be disposed to the right of the second pivot shaft 40S and comprise a pull roller 21a and a separation roller 21b. A separation pad (not depicted) may be disposed opposite to the separation roller 21b. The document separation portion 21 may be configured to pull a plurality of documents placed on the movable tray 40 by the pull roller 21a. The document separation portion 21 may be further configured to separate one document from the plurality of documents and convey the separated document downstream in the document conveyance direction in cooperation with the separation roller 21b and the separation pad.

Then, the conveyor roller 24a and the pinch roller 23a may be configured to further convey the document separated by the document separation portion 21 to the larger-diameter conveyor roller 24b while passing the document under the second image sensor 22 disposed downstream of the conveyor roller 24a and the pinch roller 23a with respect to the document conveyance direction. The second image sensor 22 may be a so-called contact image sensor ("CIS"). The second image sensor 22 may be disposed along the conveyance path R such that a reading surface of the second image sensor 22 faces the leading path 30. The multifunction peripheral 1 may be configured to read an image from a document being conveyed through the conveyance path R by the second image sensor 22.

The larger-diameter conveyor roller 24b may be rotatably supported by a shaft on the left of the operation panel 50 and configured to be rotated by driving of a drive motor. The pinch rollers 23b, 23c may be rotatably supported by a shaft and diagonally disposed at lower right positions, respectively, with respect to the larger-diameter conveyor roller 24b. The pinch rollers 23b, 23c may be configured to be rotated in accordance with a rotation of the larger-diameter conveyor roller 24b. A peripheral surface of the larger-diameter conveyor roller 24b may define a part of the first path 31 in conjunction with a curved first guide member 36, which may be a part of the path switching mechanism portion 35. The larger-diameter conveyor roller 24b may be configured to convey the document along the first path 31 by its rotation. As described below, when the document conveyance path is changed from the first path 31 to the second path 32 by the path switching mechanism portion 35, the document may be conveyed to the document outlet 32A via the second path 32, in accordance with the rotation of the larger-diameter conveyor roller 24b. For example, when a user changes a position of the path switching mechanism portion 35, the conveyance path of a sheet may change from the first path 31 to the second path 32 or vice-versa.

The document discharge portion 25 may comprise the discharge roller 25a. The discharge roller 25a may be disposed at the upper right of the larger-diameter conveyor roller 24b and rotatably supported. The discharge roller 25a may be configured to be rotated in accordance with the rotation of the larger-diameter conveyor roller 24b. By rotating the discharge roller 25a, the document discharge portion 25 may discharge the document conveyed along the first path 31 toward the movable tray 40 functioning as the discharge tray. The discharge path 33 may be defined by a cover member 10c and a guide surface 10d. The cover member 10c may cover the rollers disposed in the document cover portion 10 and the second image sensor 22. The guide surface 10d may be spaced apart from the cover member 10c. The documents may be conveyed successively by the discharge roller 25a through the discharge path 33 and then stacked on the movable tray 40. The document discharge portion 25 may include a document discharge separation portion 25b that separates discharged documents from documents that have not yet been fed to the conveyor 20. Thus, a trailing edge of the document discharged on the movable tray 40 in the document conveyance direction may remain in the discharge path 33. Therefore, the discharged document might not be fed again.

The path switching mechanism portion 35 is now described. As depicted in FIG. 4, the path switching mechanism portion 35 may be adjacently disposed on the left of the operation panel 50 and configured to switch the document conveyance path between the first path 31 and the second path 32. The path switching mechanism portion 35 may comprise a first guide member 36, a second guide member 37, and a coupling member 38. The first guide member 36 may comprise a curve-shaped plate member and define a part of the first path 31 in conjunction with the peripheral surface of the larger-diameter conveyor roller 24b. The first guide member 36 may be swingably supported by a shaft at its lower end. The second guide member 37 may be disposed on the right of the first guide member 36 and comprise a plate-shaped member extending in the up-down direction. One end of the coupling member 38 may be coupled to an upper end part of the first guide member 36 and the other end of the coupling member 38 may be coupled to an upper end part of the second guide member 37. The coupling member 38 may be configured to be movable between a position indicated by a solid line and a position indicated by a dashed line in FIG. 4.

When the path switching mechanism portion 35 is located in the position indicated by the solid line in FIG. 4, the path switching mechanism portion 35 may define the first path 31 between the peripheral surface of the larger-diameter conveyor roller 24b and the first guide member 36 to guide the document being conveyed by the larger-diameter conveyor roller 24b in a direction that the document may be inverted upside down. When the path switching mechanism portion 35 is moved to the position indicated by the dashed line in FIG. 4, the path switching mechanism portion 35 may define the second path 32 to guide the document being conveyed by the larger-diameter conveyor roller 24b to the document outlet 32A. More specifically, when the first guide member 36 and the second guide member 37 are inclined, the document outlet 32A may be defined between a right end of the guide surface 10d and the second guide member 37 and the inclined first and second guide members 36, 37 may provide a surface for guiding the document to the document outlet 32A. Thus, the document conveyance path may be switched between the first path 31 and the second path 32 by the position change of the path switching mechanism portion 35.

A configuration of the scanner unit 70 in the multifunction peripheral 1 is now described with reference to FIGS. 1-3. As described above, the scanner unit 70 may comprise the contact glass 72 constituting the document mount surface 71, the first image sensor 73, and the slide shaft in the upper part of the body housing 60. The scanner unit 70 may be configured to read an image from the document placed on the document mount surface 71 by the first image sensor 73. The scanner unit 70 may be further configured to read an image from a document being conveyed by the automatic document conveyor 20 by the first image sensor 73 that may be stationary.

The document mount surface 71 may be defined by the contact glass 72 that may define the upper surface of the body housing 60. The document mount surface 71 may be configured such that a document to be read by the scanner unit 70 may be placed thereon. The contact glass 72 may be a so-called platen glass and have a rectangular shape in a size that may be slightly larger than a largest-sized document that the multifunction peripheral 1 may deal with and whose longer sides may extend along the right-left direction of the body housing 60 when the document is placed on the contact glass 72.

The first image sensor 73 may be a so-called contact image sensor ("CIS"). The first image sensor 73 may comprise a light source and an image pickup device. The first image sensor 73 may be disposed such that its upper surface may face the contact glass 72. The first image sensor 73 may be disposed so as to be slidable below the contact glass 72 along the slide shaft extending along the right-left direction of the body housing 60 (i.e., a sub-scanning direction).

The first image sensor 73 may be normally located at the initial position defined below a left end portion of the contact glass 72. The first image sensor 73 may be configured to be slidable along the lower surface of the contact glass 72 from the initial position by a distance corresponding to the size of the longer side of the largest-sized document. The first image sensor 73 may be configured to read an image from the document placed on the contact glass 72 while sliding under the contact glass 72 along the slide shaft from the initial position.

A configuration of the image formation unit 80 is now described with reference to FIGS. 1 and 2. The image formation unit 80 may comprise the sheet cassette 81, the sheet feed portion 82, the recording head 85, the platen 86, the sheet outlet 87, and the sheet output portion 88. The image formation unit 80 may be configured to form an image onto a sheet while conveying the sheet along the front-rear direction of the multifunction peripheral 1 from the sheet cassette 81.

The sheet cassette 81 may be removably attached to the front of the body housing 60 and configured to accommodate a stack of one or more sheets (or recording mediums). As described above, the sheet may be accommodated in the sheet cassette 81 such that longer sides of the sheet may extend along the right-left direction of the multifunction peripheral 1. The sheet accommodated in the sheet cassette 81 may be conveyed along a predetermined conveyance path extending along the front-rear direction of the multifunction peripheral 1. Therefore, the sheet may be conveyed while one of the longer sides of the sheet may become a leading edge when an image is formed onto the sheet by the image formation unit 80.

The sheet feed portion 82 may comprise a sheet feed roller, and a sheet conveyor roller. The sheet feed portion 82 may be configured to convey a sheet accommodated in the sheet cassette 81 along the predetermined conveyance path along the front-rear direction of the multifunction peripheral 1 in order to feed the sheet to a position between the recording head 85 and the platen 86.

The recording head 85 may comprise nozzles having ejection ports. The recording head 85 may be configured to eject ink droplets toward the platen 86 from the ejection ports by which the nozzles are deformed by a piezoelectric element under control of the controller. The multifunction peripheral 1 may be configured to form an image on a substantially entire surface of a sheet based on image data by ejecting ink from the recording head 85 that is reciprocating along the right-left direction while conveying the sheet forward over the platen 86.

As depicted in FIG. 1, the recording head 85 may be disposed such that the recording head 85 is capable of reciprocating between head standby positions S at both right and left end parts of the body housing 60. As described above, the one or more sheets may be accommodated in the sheet cassette 81 such that the longer sides of the one or more sheets may extend parallel to an axial direction of the first pivot shaft 10S. As depicted in FIG. 2, the image formation unit 80 may be configured to form an image onto the sheet while conveying the sheet from the sheet cassette 81 through the path extending along the front-rear direction of the multifunction peripheral 1. As described above, the image formation unit 80 may form an image onto a substantially entire surface of the sheet. Therefore, a distance between the right and left head standby positions S may be longer than or equal to at least a length of the longer sides of the sheet. As depicted in FIG. 1, the document separation portion 21 of the document cover portion 10 and the second pivot shaft 40S of the movable tray 40 may be located above the head standby position S provided in the left part of the body housing 60.

As depicted in FIGS. 1 and 2, the body housing 60 may have the sheet outlet 87 and the sheet output portion 88 above the sheet cassette 81. The sheet outlet 87 may be opened in a position corresponding to a space between the recording head 85 and the platen 86. The sheet outlet 87 may be configured to discharge therethrough a sheet on which an image has been formed by the image formation unit 80. The sheet output portion 88 may be configured such that one or more sheets discharged via the sheet outlet 87 may be stacked.

As described above, in the multifunction peripheral 1 according to the first illustrative embodiment, the automatic document conveyor 20, the movable tray 40, and the operation panel 50 may be disposed in the document cover portion 10. The movable tray 40 may be disposed pivotably about the second pivot shaft 40S extending along the front-rear direction at the left end of the document cover portion 10. As depicted in FIGS. 1 and 3, the movable tray 40 may function as the document tray when opened. Therefore, according to the multifunction peripheral 1, while the automatic document conveyor 20 of the document cover portion 10 conveys a document placed on the movable tray 40, the multifunction peripheral 1 may be configured to read an image from the document by the first image sensor 73 and the second image sensor 22.

Figure 5:
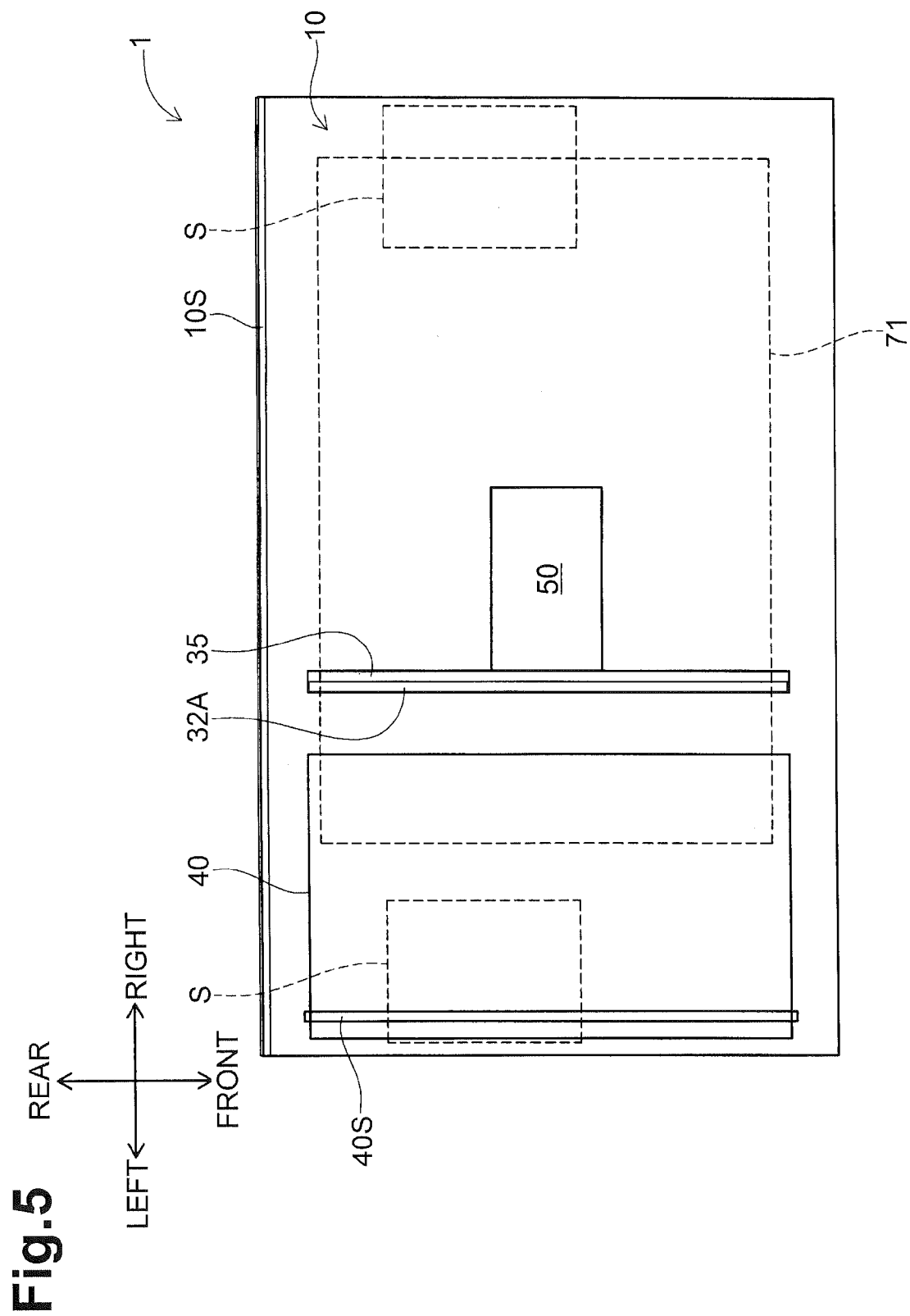
FIG. 5 is an explanatory diagram depicting a location of an operation panel in the multifunction peripheral in the first illustrative embodiment according to one or more aspects of the disclosure.

As depicted in FIG. 5, according to the multifunction peripheral 1, the operation panel 50 may be disposed at the substantially middle part of the upper surface of the document cover portion 10. With this configuration, the operation panel 50 may be located on the upper surface of the document cover portion 10 and above the document mount surface 71. Therefore, according to the multifunction peripheral 1, an area of an upper surface of the multifunction peripheral 1 may be reduced as compared with a case where an operation panel is disposed so as to project toward the outside of the multifunction peripheral 1. Thus, this configuration may result in space savings when the multifunction peripheral 1 is installed in a desired location.

As depicted in FIGS. 1 and 3, when the movable tray 40 is configured to serve as the document tray and the discharge tray and to move to an open position away from the operation panel 50, the operation panel 50 may be made accessible. Therefore, although one or more documents are placed on the movable tray 40, the operation panel 50 might not be covered by the one or more documents. Thus, according to the multifunction peripheral 1, this configuration may ensure convenient operation of the operation panel 50 for a user when the one or more documents are placed on the document tray.

Further, in the multifunction peripheral 1, the second pivot shaft 40S may be disposed at the left end portion of the document cover portion 10. When the movable tray 40 is closed toward the operation panel 50, the movable tray 40 may constitute the part of the upper surface of the document cover portion 10. That is, when the movable tray 40 is not used as the document tray, the movable tray 40 may function as the part of the upper surface of the document cover portion 10 in the closed position (indicated by the dashed line in FIGS. 1 and 3). Therefore, the multifunction peripheral 1 may save space when in the closed position.

As depicted in FIG. 3, according to the multifunction peripheral 1, the first path 31 that may function as a reversible portion of the conveyance path R in the automatic document conveyor 20 may be defined on the left of the operation panel 50 disposed at the substantially middle part of the document cover portion 10. Therefore, the operation panel 50 and the first path 31 might not overlap each other in the document cover portion 10 with respect to the up-down direction. That is, according to the multifunction peripheral 1, an increase in thickness of the document cover portion 10 may be reduced or avoided, and thus, the size of the multifunction peripheral 1 in the up-down direction may be improved.

According to the multifunction peripheral 1, the document separation portion 21 of the automatic document conveyor 20 may be disposed in the leftward part of the document cover portion 10 and the operation panel 50 may be disposed in the substantially middle part of the document cover portion 10 (see FIGS. 1 and 3). Therefore, the document separation portion 21 and the operation panel 50 might not overlap each other in the document cover portion 10 with respect to the up-down direction. Therefore, according to the multifunction peripheral 1, an increase in thickness of the document cover portion 10 may be reduced or avoided, and thus, the size of the multifunction peripheral 1 in the up-down direction may be improved.

As depicted in FIGS. 1 and 3, the document discharge portion 25 of the automatic document conveyor 20 may be disposed in the leftward part of the document cover portion 10 and the operation panel 50 may be disposed in the substantially middle part of the document cover portion 10. Therefore, the document discharge portion 25 and the operation panel 50 might not overlap each other in the document cover portion 10 with respect to the up-down direction. Thus, according to the multifunction peripheral 1, an increase in thickness of the document cover portion 10 may be reduced or avoided, and thus, the size of the multifunction peripheral 1 in the up-down direction may be improved. Further, with this configuration, the discharged document might not be placed over the operation panel 50.

According to the multifunction peripheral 1, the movable tray 40 may function as the document tray and the discharge tray. Therefore, this configuration may facilitate the configuration of the automatic document conveyor 20 as compared with a case where a dedicated discharge tray may be provided. Thus, the multifunction peripheral 1 may offer advantages in terms of size.

According to the multifunction peripheral 1, the path switching mechanism portion 35 may be disposed at the branch point of the first path 31 and the second path 32 in the conveyance path R. With this configuration, the path of the document being conveyed in the conveyance path R may be changed between the first path and the second path. According to the multifunction peripheral 1, the path switching mechanism portion 35 may be disposed on the left of the operation panel 50. Therefore, the path switching mechanism portion 35 might not overlap the operation panel 50 in the document cover portion 10 with respect to the up-down direction. Thus, an increase in thickness of the document cover portion 10 may be reduced or avoided, and thus, the size of the multifunction peripheral 1 in the up-down direction may be improved.

The multifunction peripheral 1 may comprise the first image sensor 73 along the conveyance path R in the automatic document conveyor 20 of the document cover portion 10, and the first image sensor 73 in the scanner unit 70. Therefore, according to the multifunction peripheral 1, while conveying a document by the automatic document conveyor 20, the multifunction peripheral 1 may read images from both sides of the document using the first image sensor 73 and the second image sensor 22, respectively. Further, according to the multifunction peripheral 1, in the document cover portion 10, the second image sensor 22 may be disposed inside the U-shaped conveyance path R and on the left of the larger-diameter conveyor roller 24b as depicted in FIG. 3. Therefore, the second image sensor 22 may be disposed at the position that might not overlap the operation panel 50 with respect to the up-down direction. Thus, an increase in thickness of the document cover portion 10 may be reduced or avoided, and thus, the size of the multifunction peripheral 1 in the up-down direction may be improved.

As depicted in FIGS. 1 and 3, when the movable tray 40 is closed, the movable tray 40 may be on the same plane as the document cover portion 10 and the operation panel 50. That is, according to the multifunction peripheral 1, the document cover portion 10 might not have uneven portions in its upper surface (e.g., the upper surface of the movable tray may be approximately even with the uppers surface of the operation panel 50 to produce a flat upper surface of the document cover portion 10). Therefore, an appearance of the multifunction peripheral 1 may be enhanced. Further, the multifunction peripheral 1 may require less space when stored. When the multifunction peripheral 1 comprises a protruding portion, the protruding portion may be damaged due to contact with another object while being transported. In this respect, the multifunction peripheral 1 may have the flat upper surface of the document cover portion 10. Therefore, a risk of damaging the multifunction peripheral 1 may be reduced when carrying the multifunction peripheral 1.

The sheet cassette 81 may be configured to accommodate one or more sheets such that the longer sides of the one or more sheets may extend in parallel to the axial direction of the first pivot shaft 10S. The image formation unit 80 may be configured to perform printing using the one or more sheets accommodated in the sheet cassette 81. Therefore, the image formation unit 80 may be increased in size in the axial direction of the first pivot shaft 10S (i.e., the right-left direction of the multifunction peripheral 1). In this respect, according to the multifunction peripheral 1, the automatic document conveyor 20 and the operation panel 50 may be effectively disposed in the document cover portion 10 by use of the expanded space. Thus, an increase in thickness of the document cover portion 10 in the up-down direction may be avoided or reduced. As described above, the front-rear direction of the multifunction peripheral 1 may correspond to a direction in which the shorter sides of the sheet extend. Therefore, according to the multifunction peripheral 1, the multifunction peripheral 1 may offer its size reduction with respect to the axial direction of the second pivot shaft (i.e., the front-rear direction of the multifunction peripheral 1).

The image formation unit 80 according to the first illustrative embodiment may comprise the recording head 85 and be configured to form an image onto a sheet using the recording head 85 and performing an inkjet method. As depicted in FIGS. 1 and 5, the head standby positions S of the recording head 85 may be defined in the both right and left parts of the body housing 60 in the image formation unit 80. The document separation portion 21 of the automatic document conveyor 20 and the second pivot shaft 40S may be disposed above the left head standby position S in the document cover portion 10. Therefore, according to the multifunction peripheral 1, the document separation portion 21 and the movable tray 40 may be disposed in the space expanded in the axial direction of the first pivot shaft 10S in accordance with the configuration of the image formation unit 80. Thus, this configuration of the multifunction peripheral 1 may have advantages in terms of size.

A second illustrative embodiment, which may be different from the above-described first illustrative embodiment, is now described with reference to the drawings. A multifunction peripheral 1 according to the second illustrative embodiment may have a similar configuration to that of the multifunction peripheral 1 according to the first illustrative embodiment, but for differences with respect to their image formation units. Therefore, a description of the parts common to the first illustrative embodiment is omitted.

Figure 6:
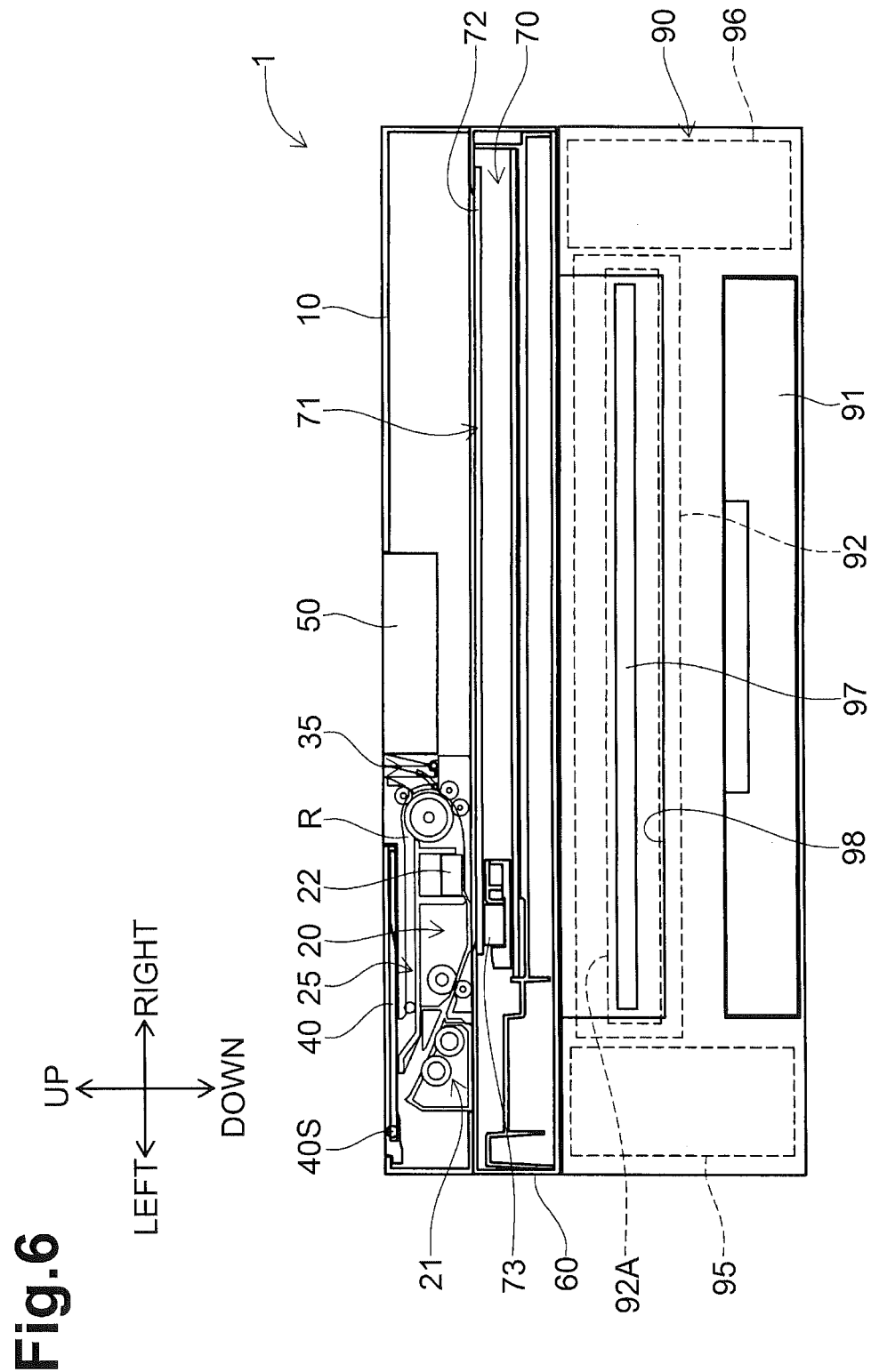
FIG. 6 is a front sectional view depicting a multifunction peripheral in a second illustrative embodiment according to one or more aspects of the disclosure.

As depicted in FIGS. 6 and 7, an image formation unit 90 may comprise a sheet cassette 91, a process unit 92, an exposure device 93, a heat fixer 94, a power supply portion 95, a drive mechanism portion 96, a sheet outlet 97, and a sheet output portion 98 arranged below the scanner unit 70 in the up-down direction. The image formation unit 90 may be configured to perform printing of an image onto a sheet supplied from the sheet cassette 91 based on inputted image data using a laser beam emitted from the exposure device 93 under control of the controller.

The sheet cassette 91 may be configured to accommodate a stack of sheets therein, similar to the sheet cassette 81 of the first illustrative embodiment. The scanner unit 70 may be configured to read an image from a document placed on the document mount surface 71 by the first image sensor 73. The scanner unit 70 may be further configured to remain stationary when reading an image from a document that is conveyed by the automatic document conveyor 20.

The process unit 92 may be removably mounted at a predetermined position above the exposure device 93. The process unit 92 may comprise a photosensitive drum 92A, a charger, a development roller, a supply roller, a layer-thickness regulation blade, a toner container and a transfer roller. The charger may be configured to charge a peripheral surface of the photosensitive drum 92A uniformly. The development roller may be configured to supply toner to an electrostatic latent image formed onto the surface of the photosensitive drum 92A. The supply roller may be configured to supply toner to the development roller. The transfer roller may be configured to transfer toner carried by the peripheral surface of the photosensitive drum 92A to the sheet.

The photosensitive drum 92A may be rotatably supported inside the process unit 92, and comprise a cylindrical drum body having conductivity. The photosensitive drum 92A may further comprise a photosensitive layer having electrostatic properties on a peripheral surface of the drum body. An electrostatic latent image corresponding to image data may be formed on the photosensitive layer of the photosensitive drum 92A by a laser beam emitted from the exposure device 93.

The exposure device 93 may be disposed in the lower part of the body housing 60, and comprise a laser emitting portion, a polygon mirror, lenses, and reflectors. The laser beam may be emitted from the laser emitting portion based on image data to ultimately form an image on a sheet. The laser beam may be emitted onto the photosensitive drum 92A constituting the process unit 92 via the polygon mirror, the lenses, and the reflectors. As described later, an electrostatic latent image corresponding to image data may be formed onto the surface of the photosensitive drum 92A by a laser beam emitted from the laser emitting portion.

The heat fixer 94 may be disposed between the process unit 92 and the sheet outlet 97, and comprise a heat roller and a pressure roller. The heat fixer 94 may be configured to melt toner transferred onto the sheet by the process unit 92 and thermally fix the formed image onto the sheet using the heat roller and the pressure roller.

As depicted in FIGS. 6 and 8, the power supply portion 95 may be disposed on the left of the process unit 92 in the body housing 60, and configured to supply power for forming an image using the image formation unit 90. The drive mechanism portion 96 may be disposed on the right of the process unit 92 in the body housing 60, and configured to transmit a drive force to the photosensitive drum 92A for forming an image by the image formation unit 90.

As depicted in FIGS. 6 and 7, the sheet outlet 97 and the sheet output portion 98 may be defined above the sheet cassette 91 that may be detachably attached to the front of the body housing 60. The sheet outlet 97 may be configured to discharge therethrough a sheet on which an image has been formed by the image formation unit 90. The sheet output portion 98 may be configured such that one or more sheets discharged via the sheet outlet 97 may be stacked thereon.

The multifunction peripheral 1 of the second illustrative embodiment may have similar effects as the multifunction peripheral 1 according to the first illustrative embodiment, except the portion involving the image formation unit. Therefore, an increase in thickness of the document cover portion 10 may be reduced or avoided, and thus, the size of the multifunction peripheral 1 in the up-down direction may be improved.

As described above, in the multifunction peripheral 1 according to the second illustrative embodiment, the power supply portion 95 of the image formation unit 90 may be disposed on the left of the process unit 92 in the body housing 60. The automatic document conveyor 20 may be disposed on the left of the document cover portion 10. That is, in the multifunction peripheral 1 according to the second illustrative embodiment, the automatic document conveyor 20 may be disposed above the power supply portion 95. Therefore, the automatic document conveyor 20 may be disposed in a space that may be expanded in the axial direction of the first pivot shaft 10S (i.e., the right-left direction of the multifunction peripheral 1) in accordance with the configuration of the image formation unit 90. Therefore, the multifunction peripheral 1 may offer advantages in terms of size.

While the disclosure has been described in detail with reference to specific embodiments, these are merely examples, and various changes, arrangements and modifications may be applied therein without departing from the spirit and scope of the disclosure. In the above-described embodiments, the multifunction peripheral having a scanning function and a printing function may be taken as an example. Nevertheless, the multifunction peripheral might not be limited to the above-described embodiments. In other embodiments, for example, the disclosure may be applied to a scanner (e.g., a so-called flatbed scanner) or a copying machine having the scanning function and the printing function.

In the above-described embodiments, the document cover portion 10 may be configured to pivot about the first pivot shaft 10S. Nevertheless, in other embodiments, for example, the document cover portion 10 might not necessarily pivot about a shaft as long as the document cover portion 10 is movable between a position where the document cover portion 10 covers the upper surface of the document mount surface 71 and a position where the document cover portion 10 uncovers the upper surface of the document mount surface 71. Similar to this, in the above-described embodiments, the movable tray 40 may be configured to pivot about the second pivot shaft 40S. Nevertheless, in other embodiments, the movable tray 40 might not necessarily pivot about a shaft as long as the movable tray 40 is movable between a position where the movable tray 40 functions as the document feed tray and/or the discharge tray and a position where the movable tray 40 functions as the upper surface of the document cover portion 10.

In the above-described embodiments, the power supply portion 95 may be disposed on the left of the body housing 60 and the drive mechanism portion 96 may be disposed on the right of the body housing 60. Nevertheless, in other embodiments, the positions of the power supply portion 95 and the drive mechanism portion 96 may be, for example, reversed.

What is claimed is:

1. An image reader, comprising:
   a document mount surface configured such that a document is to be placed thereon;
   a conveyor configured to convey one or more documents one by one successively;
   a reading unit configured to read one of an image from a document placed on the document mount surface and an image from a document being conveyed by the conveyor; and
   a cover portion configured to be movable between an uncovering position where the cover portion exposes the document mount surface and a covering position where the cover portion covers the document mount surface by pivoting about a first axis,
   the cover portion comprising:
     the conveyor;
     an operation portion configured to receive an input; and
     a movable member configured to be movable between an open position where the movable member functions as a document tray and a closed position where the movable member constitutes a part of an upper surface of the cover portion by pivoting about a second axis,
     wherein the second axis is disposed at one end of the movable member and the other end of the movable member is located in a position farther from the operation portion when the movable member is in the open position than when the movable member is in the closed position, and wherein the operation portion is disposed on the upper surface of the cover portion at a position in which the operation portion does not overlap with the movable member and the conveyor in an up-down direction and is spaced apart from an edge of the cover portion that is on the opposite side of the operation portion than the conveyor.

2. The image reader according to claim 1, wherein the cover portion defines a part of a conveyance path in which a document is conveyed by the conveyor, and the cover portion defines a first path configured to change a conveying direction of the document conveyed along the conveyance path.

3. The image reader according to claim 2, wherein the conveyor comprises a discharge portion disposed downstream of the first path in the conveying direction, and
   wherein the discharge portion and the operation portion do not overlap each other in the cover portion with respect to an up-down direction.

4. The image reader according to claim 3, wherein the movable member located at the open position is configured to function as a discharge tray as well as the document tray.

5. The image reader according to claim 2, wherein the cover portion comprises a switching portion configured to switch the conveyance path in which the document is conveyed to one of the first path and a second path, and
   wherein the switching portion and the operation portion do not overlap each other in the cover portion with respect to an up-down direction.

6. The image reader according to claim 1, wherein the conveyor comprises a separation portion configured to separate one document from the one or more documents placed on the document tray, and
   wherein the separation portion and the operation portion do not overlap each other in the cover portion with respect to an up-down direction.

7. The image reader according to claim 1, wherein the reading unit comprises:
   a first reading unit configured to read the image from the document placed on the document mount surface while moving under the document mount surface and along the document mount surface; and
   a second reading unit disposed along a conveyance path in the cover portion, and
   wherein the second reading unit and the operation portion do not overlap each other in the cover portion with respect to the up-down direction.

8. The image reader according to claim 1, wherein an upper surface of the movable member located at the closed position and an upper surface of the operation portion are in a same plane.

9. The image reader according to claim 1, further comprising an image formation unit configured to form an image on a sheet,
   wherein the image formation unit comprises a sheet cassette configured to accommodate one or more sheets such that the longer sides of the one or more sheets extend parallel to an axial direction of the first axis.

10. The image reader according to claim 9, wherein the image formation unit comprises a head configured to reciprocate along a predetermined direction from a predetermined standby position and to eject ink droplets toward a platen,
    wherein the conveyor comprises a separation portion configured to separate one document from the one or more documents placed on the document tray, and
    wherein the head in the predetermined standby position overlaps the separation portion and a shaft providing the second axis in the cover portion with respect to the up-down direction.

11. The image reader according to claim 9, wherein the image formation unit comprises:
    a photosensitive drum;
    an exposure device configured to form an electrostatic latent image on the photosensitive drum;
    a development member configured to supply toner to the electrostatic latent image formed on the photosensitive drum to form a toner image on the photosensitive drum;
    a transfer member configured to transfer the toner image formed on the photosensitive drum onto the sheet;
    a fixing unit configured to fix the image transferred on the sheet;
    a drive unit configured to drive components of the image formation unit, wherein the components comprise the photosensitive drum, the exposure device, the development member, the transfer member, and the fixing unit; and
    a power supply configured to supply power for image formation performed by the image formation unit,
    wherein the conveyor is disposed above at least one of the drive unit and the power supply.

12. The image reader according to claim 1, wherein the second axis intersects the first axis.

13. The image reader according to claim 1, wherein the movable member covers the conveyor when the movable member is in the closed position.

14. A cover, comprising:
a conveyor configured to convey one or more documents one by one successively;
a movable member configured to be movable between an open position where the movable member functions as a document tray and a closed position where the movable member constitutes a part of an upper surface of the cover by pivoting about a second axis,
an operation portion configured to receive an input and disposed on an upper surface of the cover at a position in which the operation portion does not overlap with the movable member and conveyor in an up-down direction and is spaced apart from an edge of the cover that is on the opposite side of the operation portion than the conveyor; and
wherein the second axis is disposed at one end of the movable member and the other end of the movable member is located in a position farther from the operation portion when the movable member is in the open position than when the movable member is in the closed position, and
wherein the cover is configured to be movable between an uncovering position where the cover exposes a document mount surface of an image reader and a covering position where the cover covers the document mount surface by pivoting about a first axis.

15. The cover of claim 14, wherein the movable member located at the open position is configured to function as a discharge tray as well as the document tray.

16. The cover of claim 14, further comprising:
a switching portion configured to switch a conveyance path in which a document is to be conveyed to one of a first path and a second path,
wherein the switching portion and the operation portion do not overlap each other in the cover with respect to an up-down direction, and
wherein a direction of the second path is more towards the operation portion than a direction of the first path.

17. The cover of claim 14, further comprising:
a switching portion configured to switch a conveyance path in which a document is to be conveyed to one of a first path and a second path,
wherein the switching portion and the operation portion do not overlap each other in the cover with respect to an up-down direction, and
wherein the switching portion is adjacent to the operation portion.

18. A multifunction peripheral, comprising:
an image formation unit configured to form an image on a sheet, wherein the image formation unit comprises:
a sheet cassette configured to accommodate one or more sheets such that the longer sides of the one or more sheets extend parallel to an axial direction of a first axis; and
a recording head configured to eject ink droplets toward a platen;
a document mount surface configured such that a document is to be placed thereon;
a conveyor configured to convey one or more documents one by one successively;
a reading unit configured to read one of an image from a document placed on the document mount surface and an image from a document being conveyed by the conveyor; and
a cover portion configured to be movable between an uncovering position where the cover portion exposes the document mount surface and a covering position where the cover portion covers the document mount surface by pivoting about the first axis,
the cover portion comprising:
the conveyor;
an operation portion configured to receive an input; and
a movable member configured to be movable between an open position where the movable member functions as a document tray and a closed position where the movable member constitutes a part of an upper surface of the cover portion by pivoting about a second axis,
wherein the second axis is disposed at one end of the movable member and the other end of the movable member is located in a position farther from the operation portion when the movable member is in the open position than when the movable member is in the closed position, and
wherein the operation portion is disposed on the upper surface of the cover portion at a position in which the operation portion does not overlap with the movable member and conveyor in an up-down direction and is spaced apart from an edge of the cover portion that is on the opposite side of the operation portion than the conveyor.

19. The multifunction peripheral of claim 18, wherein the movable member located at the open position is configured to function as a discharge tray as well as the document tray.

20. The multifunction peripheral of claim 19, further comprising:
a switching portion configured to switch a conveyance path in which a document is to be conveyed to one of a first path and a second path,
wherein the switching portion and the operation portion do not overlap each other in the cover portion with respect to an up-down direction, and
wherein the switching portion is adjacent to the operation portion.

* * * * *

UNITED STATES PATENT AND TRADEMARK OFFICE
CERTIFICATE OF CORRECTION

PATENT NO. : 8,797,613 B2  
APPLICATION NO. : 13/845340  
DATED : August 5, 2014  
INVENTOR(S) : Shougo Sato et al.

Page 1 of 1

It is certified that error appears in the above-identified patent and that said Letters Patent is hereby corrected as shown below:

In the claims,  
In Column 18, Claim 20, Line 44:  
Please delete "claim 19" and insert --claim 18--

Signed and Sealed this  
Twenty-sixth Day of July, 2016

Michelle K. Lee  
*Director of the United States Patent and Trademark Office*